United States Patent [19]

Bausch

[11] Patent Number: 4,909,369
[45] Date of Patent: Mar. 20, 1990

[54] ELECTROMAGNETIC CLUTCH

[75] Inventor: Edmund Bausch, Villingen-Schwenningen, Fed. Rep. of Germany

[73] Assignee: Binder Magnete GmbH, Villingen, Fed. Rep. of Germany

[21] Appl. No.: 140,130

[22] Filed: Dec. 31, 1987

[30] Foreign Application Priority Data

Jan. 3, 1987 [DE] Fed. Rep. of Germany ....... 8700115

[51] Int. Cl.⁴ .............................................. F16D 27/10
[52] U.S. Cl. ................. 192/84 C; 192/110 R
[58] Field of Search ............... 192/84 C, 84 B, 110 R, 192/110 B, 90, 40; 29/256; 384/125, 215, 220, 276; 16/2

[56] References Cited

U.S. PATENT DOCUMENTS

| | | | |
|---|---|---|---|
| 2,843,237 | 7/1958 | Carr | 192/40 |
| 3,263,784 | 8/1966 | Pierce | 192/84 C |
| 3,337,013 | 8/1967 | Wrensch | 192/84 C X |
| 3,381,784 | 5/1968 | Miller et al. | 192/110 B X |
| 3,515,417 | 6/1970 | Bowman | 16/2 X |
| 4,353,450 | 10/1982 | Wakefield | 192/84 C |
| 4,524,854 | 6/1985 | Miller | 192/84 C |

FOREIGN PATENT DOCUMENTS

| | | | |
|---|---|---|---|
| 1112676 | 8/1961 | Fed. Rep. of Germany | 192/84 C |
| 2174768 | 11/1986 | United Kingdom | 384/276 |

Primary Examiner—Leslie A. Braun
Assistant Examiner—Richard M. Lorence
Attorney, Agent, or Firm—Mason, Fenwick & Lawrence

[57] ABSTRACT

In an electromagnetic clutch with a fixed mounted coil body (7), a spacer in the form of a bushing is placed between coil body (7) and rotating bodies (2, 13, 5) to center said rotating bodies (2, 13, 5) of the clutch during assembly. Spacer (8) is made of a material that wears rapidly and exhibits bearing properties. As the clutch commences operation, the spacer abrades rapidly allowing the rotating bodies to run freely.

17 Claims, 1 Drawing Sheet

ELECTROMAGNETIC CLUTCH

The invention relates to an electromagnetic clutch.

In clutches of this type, the coil is mounted on a mounting surface with the coil body. The rotating part of the clutch, i.e. the driving body and the driven body, which are generally mounted on a shaft, must be centered relative to the coil body. Hence, when assembling the clutch the coil body must be centered relative to the rotating parts of the clutch when it is fastened to the mounting surface. This makes assembly tedious.

The goal of the invention is to provide a clutch of the type cited hereinabove that allows simple assembly without tedious centering of the coil body.

According to the invention, one or more spacers act as centering aids to center the coil body relative to the rotating bodies of the clutch. The entire clutch can thus be manufactured and mounted as a complete assembly, with the centered mounting of the coil body on the mounting surface being accomplished without tedious additional centering means.

The centering spacers are made of a wearing material with bearing properties: they are preferably plastic or a soft metal. The spacers, which initially hold the coil body ccentered relative to the rotating bodies during assembly and as it is being mounted, run freely a short time after the clutch begins operating, since they are worn away by abrasion. When the clutch is reassembled, e.g. after a repair, the centering spacers become effective once again. It is only after several assemblies of the clutch that the wear occurring at each new startup becomes so great that centering during assembly is no longer sufficiently precise. In the latter case, the centering spacers can be simply removed and replaced.

The choice of the material for the spacers ensures that as the assembled clutch is running in, only the spacers and not the opposite frictional surfaces are worn away. The centering spacers are so designed that they have a contact surface which is as small as possible but which must suffice for centering support. The small contact surface ensures rapid abrasion whereupon the centered clutch runs freely after assembly. The frictional heat initially developed as the clutch runs freely is thus kept low and occurs only briefly.

The centering spacers can be located at the inner circumference or the outer circumference of the fixed coil body. When they are located on the inner circumference of the coil body, making the centering spacer annular is advantageous, with the spacer being provided with projections on its inner or outer surface which can form the supporting and wearing contact surfaces. The areas of the spacer remaining between these projections and not in contact can collect the abraded material created during free running. When the centering spacers are located on the outer circumference of the coil body, these spacers can advantageously be made as centering rings or axially extending ribs or as radially extending disk-shaped pins.

Advantageously, during assembly a rotating pole body of the clutch is mounted nonrotatably on the shaft and has a hub part coaxially engaging the coil body. The centering spacer of annular-shape is pushed onto this hub part and abuts the inner circumference of the coil body. The spacer is pushed from the axial end of the clutch facing the mounting surface, between the hub part and the coil body, until it abuts a radial shoulder of the hub part. The spacer is held in this axial position by a locking ring on the hub part. The annular spacer has a radial bead on the end facing the mounting surface, the outer diameter of said bead being greater than the inner diameter of the coil body. The coil body is held axially on the hub part of the pole body by the radial bead of the spacer, which itself is held axially by the locking ring. The spacer thus holds the rotating part of the clutch and the coil body together axially during assembly of the clutch components, so that the entire clutch, composed of rotating clutch parts and coil body, can be mounted as a single unit. If the clutch must be disassembled, for example because a repair to the machine equipped with the clutch is required, the clutch can be removed as a single unit and replaced after the repair. To center it again, the abraded spacer can be pulled off axially after removing the locking ring and replaced by another, without the clutch itself having to be taken apart.

The invention will now be described in greater detail with reference to an embodiment shown in the drawing.

Figure 1:
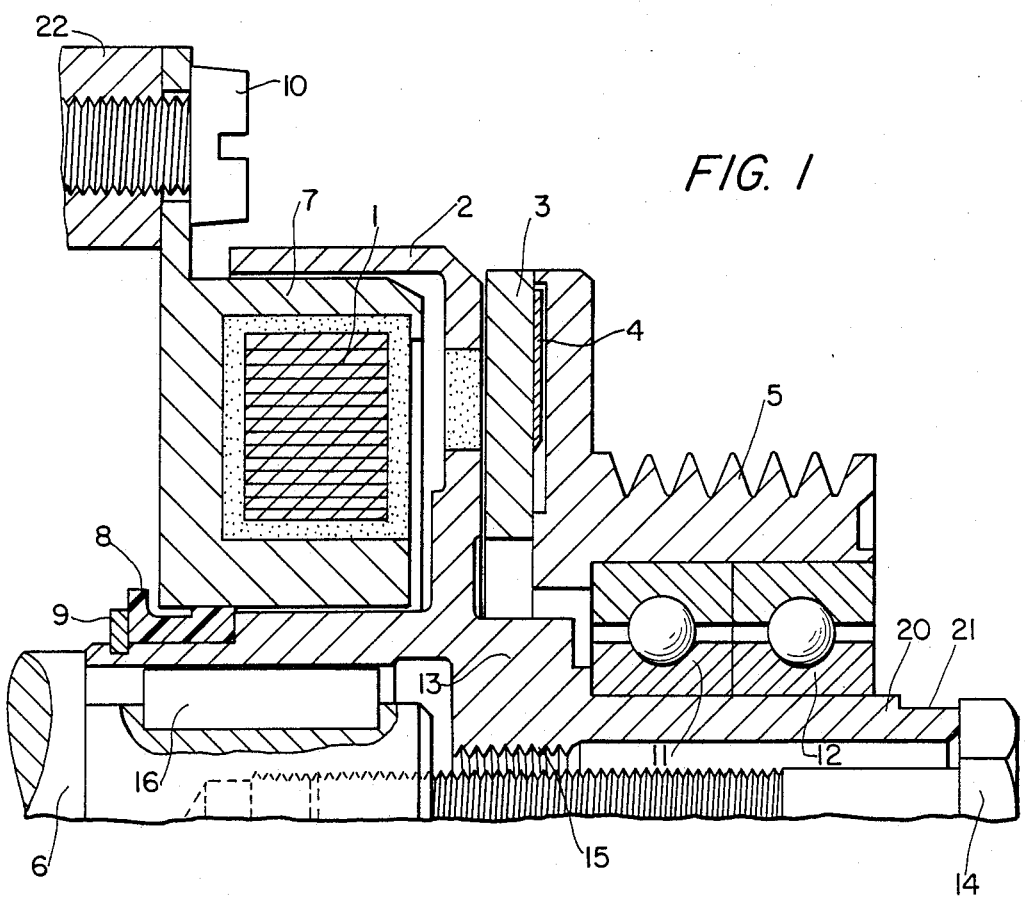
FIG. 1 is an axial section through a clutch according to the invention.

In the embodiment shown in FIG. 1, an annular coil 1 is located in a coil body 7, permanently mounted by screw 10 on a mounting surface 22.

Coil body 7 is surrounded by a pole body 2. Pole body 2 surrounds coil body 7 at its outer circumference leaving a narrow radial gap of approximately 0.2 to 1.0 mm and comprises a hub part 13 which extends coaxially into coil body 7, with a narrow redial gap of approximately 0.2 to 1.0 mm also being left between hub part 13 and the inner circumference of coil body 7.

Pole body 2 rests by its hub part 13 in a manner described below, nonrotatably on a rotating shaft 6. A pulley 5 rotatably mounted by roller bearings 11 and 12 is provided on an axial extension 20 of hub part 13. A circular armature 3 is mounted by leaf springs 4, nonrotatably but axially movably, on the face of pulley 5 which faces coil 1.

When coil 1 is energized, armature 3 is attracted axially against pole body 2 against the force of leaf springs 4, creating a positive torque-transmitting connection between pulley 5 and pole body 2, and hence shaft 6. When no current is flowing to coil 1, leaf springs 4 lift armature 3 away from pole body 2, disengaging the clutch and breaking the torque-transmitting connection between pulley 5 and shaft 6.

Hence, in this embodiment pulley 5 constitutes the rotating drive body of the clutch and pole body 2 constitutes the rotating driven body. Of course it is also possible within the scope of the invention to drive pole body 2 as the driving body through shaft 6 or in a different fashion, and to use pulley 5 or a similar rotating body as the driven body. It is also possible to bring the clutch into torque-transmitting engagement by spring force and to use the coil to disengage it electromagnetically against this spring force by energizing the coil.

To center pole body 2 relative to coil body 7 for mounting the clutch, a spacer 8 is slid from the mounting end onto hub part 13 of pole body 2 to serve as a centering spacer, until it abuts a radial shoulder of hub part 13. Spacer 8 is held in this axial position by a locking ring 9. Spacer 8 engages radially between coil body 7 and hub part 13. The mounting end of spacer 8 is located outside coil body 7 and has a radial bead whose outer diameter is greater than the inner diameter of coil body 7. Spacer 8, during assembly being held axially on hub part 13 by locking ring 9, thus holds coil body 7 axially on hub part 13 by means of this radial bead. To replace the spacer, it is merely necessary to remove locking ring 9. Spacer 8 can then be pulled off axially and replaced by a new one without having to disassemble the clutch.

Figure 2:
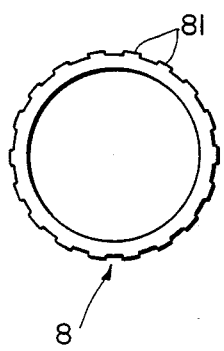
FIG. 2 is an axial end view of a first embodiment of the spacer in this clutch in a first.
Figure 3:
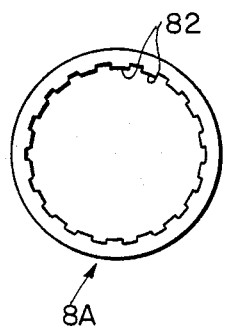
FIG. 3 is a corresponding axial end view of a second embodiment of the spacer .

Spacer 8 mounted on hub part 13 supports coil body 7 radially and in a centering fashion during assembly and mounting, with the desired small radial gap of approximately 0.2 to 1.0 mm. Spacer 8 can rest on hub part 13 by a continuous inner surface and abut coil body 7 with axial rib-shaped projections 81 on the outer surface as shown in FIG. 2. Similarly, spacer 8A can abut coil body 7 with a continuous outer surface and abut hub part 13 by axial rib-shaped projections 82 on its inner surface, as shown in FIG. 3. When, however, the clutch is running in after assembly, the contact surfaces of these rib-shaped projections abrade very rapidly, with the abraded material collecting in the spaces between the rib-shaped projections.

The part or parts of the spacer, e.g. spacer 8, which engage one or the other of the bodies 7 and 13 will abrade rapidly during the running in phase of the clutch, and will be worn away, to then permit the rotating body to run freely. The wearing away of the part or prats of the spacer is caused by the engagement of the spacer with a relatively moving part, and because of the material, i.e., plastic, soft metal, of which the spacer is made. After this wearing away, the spacer no longer has substantial, i.e. frictional, engagement with one of the bodies 7, 13; consequently, the initial support provided by spacer 8 is no longer present and support is then provided only by bearing 11.

Figure 4:
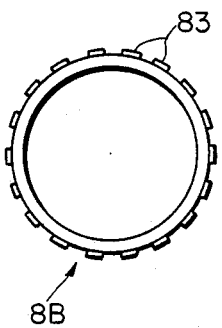
FIGS. 4 and 5 show further embodiments of spacers for use in the clutch of FIG. 1.
Figure 5:
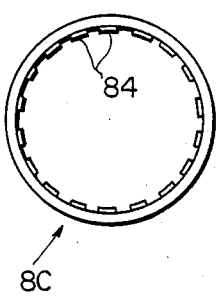
Figure 6:
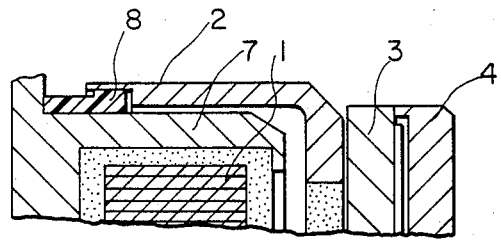

Other embodiments of a spacer are shown in FIGS. 4 and 5. In FIG. 4, a spacer 8B is shown, having pins 83 projecting from the outer surface thereof: in FIG. 5, spacer 8C has pins 84 projecting from the inner surface thereof.

A key 16 is inserted into shaft 6 to mount pole body 2 nonrotatably on shaft 6, said key engaging an axial key slot in hub part 13. A screw 14 coaxially traverses axial extension 20 of hub part 13 and is threaded into an axial blind hole in shaft 6. Screw 14 thus holds hub 13 axially against a shoulder on shaft 6.

In order to allow keyed pole body 2 to be axially removed from shaft 6, axial extension 20 has an inner diameter larger than the diameter of screw 14, as well as an inside thread 15. If screw 14 is replaced by a screw with a larger diameter, that is threaded into inside thread 15, the latter screw will abut the axial end of shaft 6 and can push hub part 13 off shaft 6 when screwed in further. In order to be able to turn screw 14 further to fasten pole body 2 or to turn the larger-diameter screws to press pole body 2 against hub part 13, axial extension 20 has keyed surface 21 on its rear end to hold hub part 13. Other suitable measures can be provided apart from keyed surfaces 21, for example a transverse bore or merely a projection to which hub part 13 can be fastened using pliers.

Pole body 2 with hub part 13, because of spacer 8, can be axially shifted during assembly and mounting over a wide range relative to coil body 7, this allows a considerable axial tolerance adjustment between mounting surface 22 and shaft 6 or between pole body 2 and hub part 13 during assembly.

I claim:

1. An electromagnetic clutch comprising:
a fixed body comprising a coil,
a rotatable driving body,
a rotatable driven body,
armature means mounted on one said rotatable body for axial, non-rotatable movement relative thereto for transmitting torque from said driving body to said driven body,
bearing means for rotatably supporting one of said rotatable bodies on the other said rotatable body, and
spacer means for providing centering support to said rotatable bodies relative to said fixed body during assembly by engaging both said fixed body and a said rotatable body and being subjected to abrasion and wearing due to rotation of said last mentioned rotatable body, said spacer means wearing as the clutch commences operation and thereby removing said centering support of said rotatable bodies by said spacer means upon commencement of operation of said clutch, and allowing the rotating bodies to run freely supported by said bearing means.

2. The electromagnetic clutch of claim 1, one said rotatable body being a pole body, a driven shaft, means for non-rotatably connecting said pole body to said shaft, and said pole body at least partially surrounding said fixed body.

3. The electromagnetic clutch of claim 2, said pole body comprising a hub, said bearing means being on said hub.

4. The electromagnetic clutch of claim 3, said spacer means engaging said hub of said pole body.

5. The electromagnetic clutch of claim 3, said pole body having a portion radially outwardly of said fixed body, and said spacer means engaging said fixed body at the outer diameter thereof.

6. The electromagnetic clutch of claim 1, said spacer means being annular.

7. The electromagnetic clutch of claim 6, and a locking ring adjacent said spacer means.

8. The electromagnetic clutch of claim 7, a part of said clutch having a radial shoulder, said spacer means engaging said radial shoulder.

9. The electromagnetic clutch of claim 7, said spacer means having a radial bead adjacent said locking ring, said bead having an outer diameter greater than the inner diameter of said fixed body.

10. The electromagnetic clutch of claim 6, wherein at least one of the inner and outer surfaces of said annular spacer means having spaced radial projections engaging said fixed body or a said rotatable body.

11. The electromagnetic clutch of claim 10, said projections being axially extending ribs.

12. The electromagnetic clutch of claim 1, said spacer means comprising axially extending ribs.

13. The electromagnetic clutch of claim 1, said spacer means being of plastic or soft metal.

14. The electromagnetic clutch of claim 1, said rotatable driven body comprising an axially extending hub, a driven shaft, means for non-rotatably connecting said hub to said shaft, said shaft having an end in said hub and said hub being hollow and extending beyond said shaft end, an internal axial thread in said shaft, and a screw threaded in said shaft and extending through said hub, said screw having a head engaging an end of said hub.

15. The electromagnetic clutch of claim 14, said hub having an internal thread for receiving a push-off screw upon removal of said first mentioned screw.

16. The electromagnetic clutch of claim 1, said spacer means comprising radially disposed pins.

17. An electromagnetic clutch comprising:
a fixed body comprising a coil,
a rotatable driving body,
a rotatable driven body,
armature means mounted on one said rotatable body for axial, non-rotatable movement relative thereto for transmitting torque from said driving body to said driven body to cause rotation of said driven body upon energization of said coil,
bearing means for rotatably supporting one of said rotatable bodies on the other said rotatable body, and
spacer means extending between and engaging said fixed body and one of said rotatable bodies prior to commencement of clutch operation for providing centering support for said rotatable bodies during assembly of said clutch, said spacer means being of material which wears sufficiently rapidly so that upon commencement of clutch operation, the spacer means is worn away from substantial engagement with at least one of the bodies which was engaged by said spacer means prior to the commencement of clutch operation.

* * * * *